(12) United States Patent
Xu

(10) Patent No.: US 10,318,135 B2
(45) Date of Patent: Jun. 11, 2019

(54) METHOD FOR ADJUSTING WINDOW DISPLAY POSITION, AND TERMINAL

(71) Applicant: Huawei Technologies Co., Ltd., Shenzhen (CN)

(72) Inventor: Yuan Xu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 501 days.

(21) Appl. No.: 14/900,896

(22) PCT Filed: Jun. 6, 2014

(86) PCT No.: PCT/CN2014/079359
§ 371 (c)(1),
(2) Date: Dec. 22, 2015

(87) PCT Pub. No.: WO2015/184637
PCT Pub. Date: Dec. 10, 2015

(65) Prior Publication Data
US 2016/0162169 A1 Jun. 9, 2016

(51) Int. Cl.
*G06F 1/16* (2006.01)
*G06F 3/01* (2006.01)
(Continued)

(52) U.S. Cl.
CPC ........ *G06F 3/04847* (2013.01); *G06F 1/1626* (2013.01); *G06F 1/1694* (2013.01);
(Continued)

(58) Field of Classification Search
CPC .. G06F 3/04847; G06F 3/0346; G06F 3/0485; G06F 3/017; G06F 1/1626; G06F 1/1694; G06F 3/0481
See application file for complete search history.

(56) References Cited

U.S. PATENT DOCUMENTS

2009/0303204 A1* 12/2009 Nasiri ................... A63F 13/06
345/184
2010/0285844 A1 11/2010 Hosoi et al.
(Continued)

FOREIGN PATENT DOCUMENTS

CN 101030982 A 9/2007
CN 101883175 A 11/2010
(Continued)

OTHER PUBLICATIONS

Partial English Translation and Abstract of Japanese Patent Application No. JPA2010263433, Nov. 30, 2016, 37 pages.
(Continued)

*Primary Examiner* — Jeffrey A Gaffin
*Assistant Examiner* — Ayesha E Huertas Torres
(74) *Attorney, Agent, or Firm* — Conley Rose, P.C.

(57) ABSTRACT

A method for adjusting a window display position, and a terminal. The method for adjusting a window display position in the present disclosure includes displaying a window in a first position of a terminal screen; acquiring a rotational angular velocity and/or a rotating angle of a terminal; determining a change of a rotation direction of the terminal according to the rotational angular velocity and/or the rotating angle; and adjusting, according to a rotational change direction of the terminal, the window to be displayed in a second position of the screen. In the embodiments of the present disclosure, a function of dynamically adjusting a window display position according to a change of a rotation direction of a terminal is implemented. After the adjustment, a user operation is more convenient.

11 Claims, 8 Drawing Sheets

(51) Int. Cl.
*G06F 3/0346* (2013.01)
*G06F 3/0481* (2013.01)
*G06F 3/0484* (2013.01)
*G06F 3/0485* (2013.01)

(52) U.S. Cl.
CPC ............ *G06F 3/017* (2013.01); *G06F 3/0346* (2013.01); *G06F 3/0481* (2013.01); *G06F 3/0485* (2013.01)

(56) References Cited

U.S. PATENT DOCUMENTS

| | | | |
|---|---|---|---|
| 2013/0113836 A1 | 5/2013 | Shin et al. | |
| 2013/0293470 A1 | 11/2013 | Kwon | |
| 2014/0085341 A1* | 3/2014 | Shin | G09G 5/38 345/659 |
| 2014/0092040 A1 | 4/2014 | Nagao et al. | |

FOREIGN PATENT DOCUMENTS

| | | | |
|---|---|---|---|
| CN | 101990026 | A | 3/2011 |
| JP | 10253361 | A | 9/1998 |
| JP | 11296294 | A | 10/1999 |
| JP | 2010263433 | A | 11/2010 |
| JP | 2012507802 | A | 3/2012 |
| JP | 2013235568 | A | 11/2013 |
| JP | 201471732 | A | 4/2014 |

OTHER PUBLICATIONS

Partial English Translation and Abstract of Japanese Patent Application No. JPA2012507802, Nov. 30, 2016, 128 pages.
Partial English Translation and Abstract of Japanese Patent Application No. JPA2013235568, Nov. 30, 2016, 41 pages.
Partial English Translation and Abstract of Japanese Patent Application No. JPA201471732, Nov. 30, 2016, 46 pages.
Partial English Translation and Abstract of Japanese Patent Application No. JPH10253361, Nov. 30, 2016, 22 pages.
Partial English Translation and Abstract of Japanese Patent Application No. JPH11-296294, Nov. 30, 2016, 25 pages.
Foreign Communication From a Counterpart Application, Japanese Application No. 2016-528310, Japanese Office Action dated Oct. 4, 2016, 3 pages.
Foreign Communication From a Counterpart Application, Japanese Application No. 2016-528310, English Translation of Japanese Office Action dated Oct. 4, 2016, 4 pages.
Partial English Translation and Abstract of Chinese Patent Application No. CN101030982, Dec. 28, 2015, 3 pages.
Partial English Translation and Abstract of Chinese Patent Application No. CN101990026, Dec. 28, 2015, 2 pages.
Foreign Communication From a Counterpart Application, PCT Application No. PCT/CN2014/079359, English Translation of International Search Report dated Mar. 3, 2015, 3 pages.
Foreign Communication From a Counterpart Application, PCT Application No. PCT/CN2014/079359, Written Opinion dated Mar. 3, 2015, 4 pages.
Foreign Communication From a Counterpart Application, European Application No. 14894032.3, Extended European Search Report dated Sep. 7, 2016, 8 pages.

* cited by examiner

METHOD FOR ADJUSTING WINDOW DISPLAY POSITION, AND TERMINAL

CROSS-REFERENCE TO RELATED APPLICATION

This application is a National Stage of International Application No. PCT/CN2014/079359, filed on Jun. 6, 2014, which is hereby incorporated by reference in its entirety.

TECHNICAL FIELD

Embodiments of the present disclosure relate to communications technologies, and in particular, to a method for adjusting a window display position, and a terminal.

BACKGROUND

With development of electronic technologies, large-screen mobile terminals are gradually gaining popularity around the world. For a large-screen or super large-screen terminal or tablet computer, a position of a relatively small popup window (popup window), such as a session window or a menu popup window, is relatively fixed. Sometimes, it is extremely inconvenient to tap content of the popup window with a single hand. According to drop-down hover technology in the prior art, by tapping a screen and dragging a popup window, a display position of the window can be dragged down to a fixed position.

A problem in the prior art is that it is relatively tedious to adjust a window display position of a terminal.

SUMMARY

Embodiments of the present disclosure provide a method for adjusting a window display position, and a terminal, so as to resolve a problem in the prior art that it is relatively tedious to adjust a window display position of a terminal.

According to a first aspect, an embodiment of the present disclosure provides a method for adjusting a window display position, including displaying a window in a first position of a terminal screen; acquiring a rotational angular velocity and/or a rotating angle of a terminal; determining a change of a rotation direction of the terminal according to the rotational angular velocity and/or the rotating angle; and adjusting, according to a rotational change direction of the terminal, the window to be displayed in a second position of the screen.

With reference to the first aspect, in a first implementation manner of the first aspect, the rotational angular velocity is a rotational angular velocity around an x-axis direction, and the rotating angle is a rotating angle around the x-axis direction; and the determining a change of a rotation direction of the terminal according to the rotational angular velocity and/or the rotating angle includes, when the rotational angular velocity around the x-axis direction and the rotating angle around the x-axis direction are respectively greater than a first preset rotational angular velocity threshold and a first preset rotating angle threshold, determining that the terminal rotates counterclockwise around the x-axis and the rotational change direction of the terminal is a downward direction; or when the rotational angular velocity around the x-axis direction and the rotating angle around the x-axis direction are respectively less than a second preset rotational angular velocity threshold and a second preset rotating angle threshold, determining that the terminal rotates clockwise around the x-axis and the rotational change direction of the terminal is an upward direction.

With reference to the first aspect, in a second implementation manner of the first aspect, the rotational angular velocity is a rotational angular velocity around an x-axis direction and a rotational angular velocity around a y-axis direction, and the rotating angle is a rotating angle around the x-axis direction and a rotating angle around the y-axis direction; and the determining a change of a rotation direction of the terminal according to the rotational angular velocity and/or the rotating angle includes, when an absolute value of the rotational angular velocity around the x-axis direction is greater than an absolute value of the rotational angular velocity around the y-axis direction, and the rotational angular velocity around the x-axis direction and the rotating angle around the x-axis direction are respectively greater than a first preset rotational angular velocity threshold and a first preset rotating angle threshold, determining that the terminal rotates counterclockwise around the x-axis and the rotational change direction of the terminal is a downward direction; or when an absolute value of the rotational angular velocity around the x-axis direction is greater than an absolute value of the rotational angular velocity around the y-axis direction, and the rotational angular velocity around the x-axis direction and the rotating angle around the x-axis direction are respectively less than a second preset rotational angular velocity threshold and a second preset rotating angle threshold, determining that the terminal rotates clockwise around the x-axis and the rotational change direction of the terminal is an upward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively greater than a first preset rotational angular velocity threshold and a first preset rotating angle threshold, determining that the terminal rotates counterclockwise around the y-axis and the rotational change direction of the terminal is a rightward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively less than a second preset rotational angular velocity threshold and a second preset rotating angle threshold, determining that the terminal rotates clockwise around the y-axis and the rotational change direction of the terminal is a leftward direction is a leftward direction.

With reference to the first aspect or the first and the second implementation manners of the first aspect, in a third implementation manner of the first aspect, before the adjusting, according to a rotational change direction of the terminal, the window to be displayed in a second position of the screen, the method includes presetting displacement by which the window moves.

With reference to the third implementation manner of the first aspect, in a fourth implementation manner of the first aspect, the adjusting, according to a rotational change direction of the terminal, the window to be displayed in a second position of the screen includes moving the window of the terminal towards the rotational change direction by the displacement, and adjusting the window to be displayed in the second position of the screen.

According to a second aspect, an embodiment of the present disclosure provides a terminal, including a display module configured to display a window in a first position of a terminal screen; an acquiring module configured to acquire a rotational angular velocity and/or a rotating angle of the terminal; and a determining module configured to determine a change of a rotation direction of the terminal according to the rotational angular velocity and/or the rotating angle; where the display module is further configured to adjust, according to a rotational change direction of the terminal, the window to be displayed in a second position of the screen.

With reference to the second aspect, in a first implementation manner of the second aspect, the rotational angular velocity is a rotational angular velocity around an x-axis direction, and the rotating angle is a rotating angle around the x-axis direction; and the determining module is configured to, when the rotational angular velocity around the x-axis direction and the rotating angle around the x-axis direction are respectively greater than a first preset rotational angular velocity threshold and a first preset rotating angle threshold, determine that the terminal rotates counterclockwise around the x-axis and the rotational change direction of the terminal is a downward direction; or when the rotational angular velocity around the x-axis direction and the rotating angle around the x-axis direction are respectively less than a second preset rotational angular velocity threshold and a second preset rotating angle threshold, determine that the terminal rotates clockwise around the x-axis and the rotational change direction of the terminal is an upward direction.

With reference to the second aspect, in a second implementation manner of the second aspect, the rotational angular velocity is a rotational angular velocity around an x-axis direction and a rotational angular velocity around a y-axis direction, and the rotating angle is a rotating angle around the x-axis direction and a rotating angle around the y-axis direction; and the determining module is configured to, when an absolute value of the rotational angular velocity around the x-axis direction is greater than an absolute value of the rotational angular velocity around the y-axis direction, and the rotational angular velocity around the x-axis direction and the rotating angle around the x-axis direction are respectively greater than a first preset rotational angular velocity threshold and a first preset rotating angle threshold, determine that the terminal rotates counterclockwise around the x-axis and the rotational change direction of the terminal is a downward direction; or when an absolute value of the rotational angular velocity around the x-axis direction is greater than an absolute value of the rotational angular velocity around the y-axis direction, and the rotational angular velocity around the x-axis direction and the rotating angle around the x-axis direction are respectively less than a second preset rotational angular velocity threshold and a second preset rotating angle threshold, determine that the terminal rotates clockwise around the x-axis and the rotational change direction of the terminal is an upward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively greater than a first preset rotational angular velocity threshold and a first preset rotating angle threshold, determine that the terminal rotates counterclockwise around the y-axis and the rotational change direction of the terminal is a leftward direction is a rightward direction; or when an absolute value of the rotational angular velocity around the y-axis direction is greater than an absolute value of the rotational angular velocity around the x-axis direction, and when the rotational angular velocity around the y-axis direction and the rotating angle around the y-axis direction are respectively less than a second preset rotational angular velocity threshold and a second preset rotating angle threshold, determine that the terminal rotates clockwise around the y-axis and the rotational change direction of the terminal is a leftward direction.

With reference to the second aspect or the first and the second implementation manners of the second aspect, in a third implementation manner of the second aspect, the determining module is further configured to preset displacement by which the window moves.

With reference to the third implementation manner of the second aspect, in a fourth implementation manner of the second aspect, the display module is configured to move the window of the terminal towards the rotational change direction by the displacement, and adjust the window to be displayed in the second position of the screen.

According to a third aspect, an embodiment of the present disclosure provides a terminal, including a processor, a display, and a sensor; where the display is configured to display a window in a first position; the sensor is configured to acquire a rotational angular velocity and/or a rotating angle of the terminal; the processor is configured to determine a change of a rotation direction of the terminal according to the rotational angular velocity and/or the rotating angle that are/is acquired by the sensor; and the display is further configured to adjust, according to a rotational change direction of the terminal, the window to be displayed in a second position.

With reference to the third aspect, in a first implementation manner of the third aspect, the sensor is further configured to acquire a rotational angular velocity around an x-axis direction and/or a rotating angle around the x-axis direction of the terminal; and the processor is further configured to, when the rotational angular velocity around the x-axis direction and the rotating angle around the x-axis direction are respectively greater than a first preset rotational angular velocity threshold and a first preset rotating angle threshold, determine that the terminal rotates counterclockwise around the x-axis and the rotational change direction of the terminal is a downward direction; or when the rotational angular velocity around the x-axis direction and the rotating angle around the x-axis direction are respectively less than a second preset rotational angular velocity threshold and a second preset rotating angle threshold, determine that the terminal rotates clockwise around the x-axis and the rotational change direction of the terminal is an upward direction.

With reference to the third aspect, in a second implementation manner of the third aspect, the sensor is further configured to acquire a rotational angular velocity around an x-axis direction and a rotational angular velocity around a y-axis direction, and/or a rotating angle around the x-axis direction and a rotating angle around the y-axis direction of the terminal; and the processor is further configured to, when an absolute value of the rotational angular velocity around the x-axis direction is greater than an absolute value of the rotational angular velocity around the y-axis direction, and the rotational angular velocity around the x-axis direction and the rotating angle around the x-axis direction are respectively greater than a first preset rotational angular velocity threshold and a first preset rotating angle threshold, determine that the terminal rotates counterclockwise around the x-axis and the rotational change direction of the terminal is a downward direction; or when an absolute value of the rotational angular velocity around the x-axis direction is greater than an absolute value of the rotational angular velocity around the y-axis direction, and the rotational angular velocity around the x-axis direction and the rotating angle around the x-axis direction are respectively less than a second preset rotational angular velocity threshold and a second preset rotating angle threshold, determine that the terminal rotates clockwise around the x-axis and the rotational change direction of the terminal is an upward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively greater than a first preset rotational angular velocity threshold and a first preset rotating angle threshold, determine that the terminal rotates counterclockwise around the y-axis and the rotational change direction of the terminal is a rightward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively less than a second preset rotational angular velocity threshold and a second preset rotating angle threshold, determine that the terminal rotates clockwise around the y-axis and the rotational change direction of the terminal is a leftward direction.

With reference to the third aspect or the first and the second implementation manners of the third aspect, in a third implementation manner of the third aspect, the processor is further configured to preset displacement by which the window moves.

With reference to the third implementation manner of the third aspect, in a fourth implementation manner of the third aspect, the display is further configured to move the window of the terminal towards the rotational change direction by the displacement, and adjust the window to be displayed in the second position.

According to a fourth aspect, an embodiment of the present disclosure provides an interface display method, where the method is applied to a mobile terminal, and the mobile terminal includes a display screen and an application program; and the method includes invoking the application program, and displaying an application program interface in a first position of the display screen; detecting a rotational angular velocity and/or a rotating angle of the mobile terminal; determining a change of a rotation direction of the mobile terminal according to the rotational angular velocity and/or the rotating angle; and displaying the application program interface in a second position of the display screen according to a rotational change direction of the mobile terminal.

With reference to the fourth aspect, in a first implementation manner of the fourth aspect, the rotational angular velocity is a rotational angular velocity around an x-axis direction, and the rotating angle is a rotating angle around the x-axis direction; and the determining a change of a rotation direction of the mobile terminal according to the rotational angular velocity and/or the rotating angle includes, when the rotational angular velocity around the x-axis direction and the rotating angle around the x-axis direction are respectively greater than a first preset rotational angular velocity threshold and a first preset rotating angle threshold, determining that the mobile terminal rotates counterclockwise around the x-axis and the rotational change direction of the mobile terminal is a downward direction; or when the rotational angular velocity around the x-axis direction and the rotating angle around the x-axis direction are respectively less than a second preset rotational angular velocity threshold and a second preset rotating angle threshold, determining that the mobile terminal rotates clockwise around the x-axis and the rotational change direction of the mobile terminal is an upward direction.

With reference to the fourth aspect, in a second implementation manner of the fourth aspect, the rotational angular velocity is a rotational angular velocity around an x-axis direction and a rotational angular velocity around a y-axis direction, and the rotating angle is a rotating angle around the x-axis direction and a rotating angle around the y-axis direction; and the determining a change of a rotation direction of the mobile terminal according to the rotational angular velocity and/or the rotating angle includes, when an absolute value of the rotational angular velocity around the x-axis direction is greater than an absolute value of the rotational angular velocity around the y-axis direction, and the rotational angular velocity around the x-axis direction and the rotating angle around the x-axis direction are respectively greater than a first preset rotational angular velocity threshold and a first preset rotating angle threshold, determining that the mobile terminal rotates counterclockwise around the x-axis and the rotational change direction of the mobile terminal is a downward direction; or when an absolute value of the rotational angular velocity around the x-axis direction is greater than an absolute value of the rotational angular velocity around the y-axis direction, and the rotational angular velocity around the x-axis direction and the rotating angle around the x-axis direction are respectively less than a second preset rotational angular velocity threshold and a second preset rotating angle threshold, determining that the mobile terminal rotates clockwise around the x-axis and the rotational change direction of the mobile terminal is an upward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively greater than a first preset rotational angular velocity threshold and a first preset rotating angle threshold, determining that the mobile terminal rotates counterclockwise around the y-axis and the rotational change direction of the mobile terminal is a rightward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively less than a second preset rotational angular velocity threshold and a second preset rotating angle threshold, determining that the mobile terminal rotates clockwise around the y-axis and the rotational change direction of the mobile terminal is a leftward direction.

With reference to the fourth aspect or the first and the second implementation manners of the fourth aspect, in a third implementation manner of the fourth aspect, before the displaying the application program interface in a second position of the display screen according to a rotational change direction of the mobile terminal, the method includes presetting displacement by which the application program interface moves.

With reference to the third implementation manner of the fourth aspect, in a fourth implementation manner of the fourth aspect, the displaying the application program interface in a second position of the display screen according to a rotational change direction of the mobile terminal includes moving the application program interface of the mobile terminal towards the rotational change direction by the displacement, and displaying the application program interface in the second position of the display screen.

According to a fifth aspect, an embodiment of the present disclosure provides an interface display apparatus, where the apparatus includes a display, a processor, and a sensor; where the display is configured to display an application program interface in a first position of the display; the sensor is configured to detect a rotational angular velocity and/or a rotating angle of the apparatus; the processor is configured to determine a change of a rotation direction of the apparatus according to the rotational angular velocity and/or the rotating angle; and the display is further configured to display the application program interface in a second position of the display according to a rotational change direction of the apparatus.

With reference to the fifth aspect, in a first implementation manner of the fifth aspect, the sensor is further configured to detect a rotational angular velocity around an x-axis direction and/or a rotating angle around the x-axis direction of the apparatus; and the processor is further configured to, when the rotational angular velocity around the x-axis direction and the rotating angle around the x-axis direction are respectively greater than a first preset rotational angular velocity threshold and a first preset rotating angle threshold, determine that the apparatus rotates counterclockwise around the x-axis and the rotational change direction of the apparatus is a downward direction; or when the rotational angular velocity around the x-axis direction and the rotating angle around the x-axis direction are respectively less than a second preset rotational angular velocity threshold and a second preset rotating angle threshold, determine that the apparatus rotates clockwise around the x-axis and the rotational change direction of the apparatus is an upward direction.

With reference to the fifth aspect, in a second implementation manner of the fifth aspect, the sensor is further configured to detect a rotational angular velocity around an x-axis direction and a rotational angular velocity around a y-axis direction, and/or a rotating angle around the x-axis direction and a rotating angle around the y-axis direction of the apparatus; and the processor is further configured to, when an absolute value of the rotational angular velocity around the x-axis direction is greater than an absolute value of the rotational angular velocity around the y-axis direction, and the rotational angular velocity around the x-axis direction and the rotating angle around the x-axis direction are respectively greater than a first preset rotational angular velocity threshold and a first preset rotating angle threshold, determine that the terminal rotates counterclockwise around the x-axis and the rotational change direction of the terminal is a downward direction; or when an absolute value of the rotational angular velocity around the x-axis direction is greater than an absolute value of the rotational angular velocity around the y-axis direction, and the rotational angular velocity around the x-axis direction and the rotating angle around the x-axis direction are respectively less than a second preset rotational angular velocity threshold and a second preset rotating angle threshold, determine that the apparatus rotates clockwise around the x-axis and the rotational change direction of the apparatus is an upward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively greater than a first preset rotational angular velocity threshold and a first preset rotating angle threshold, determine that the apparatus rotates counterclockwise around the y-axis and the rotational change direction of the apparatus is a rightward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively less than a second preset rotational angular velocity threshold and a second preset rotating angle threshold, determine that the apparatus rotates clockwise around the y-axis and the rotational change direction of the apparatus is a leftward direction.

With reference to the fifth aspect or the first and the second implementation manners of the fifth aspect, in a third implementation manner of the fifth aspect, the processor is further configured to preset displacement by which the application program interface moves.

With reference to the third implementation manner of the fifth aspect, in a fourth implementation manner of the fifth aspect, the display is further configured to move the application program interface of the apparatus towards the rotational change direction by the displacement, and display the application program interface in the second position of the display.

According to the method for adjusting a window display position, and the terminal in the embodiments of the present disclosure, a window is displayed in a first position of a terminal screen, a rotational angular velocity and/or a rotating angle of the terminal is acquired, a change of a rotation direction of the terminal is determined according to the rotational angular velocity and/or the rotating angle, and finally the window is adjusted, according to a rotational change direction of the terminal, to be displayed in a second position of the screen, thereby implementing a function of dynamically adjusting a window position according to a change of a rotation direction of a terminal. After the adjustment, a user operation is more convenient, and a problem in the prior art that it is relatively tedious to adjust a window display position of a terminal is resolved.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are a part rather than all of the embodiments of the present disclosure. All other embodiments obtained by persons of ordinary skill in the art based on the embodiments of the present disclosure without creative efforts shall fall within the protection scope of the present disclosure.

Figure 1:
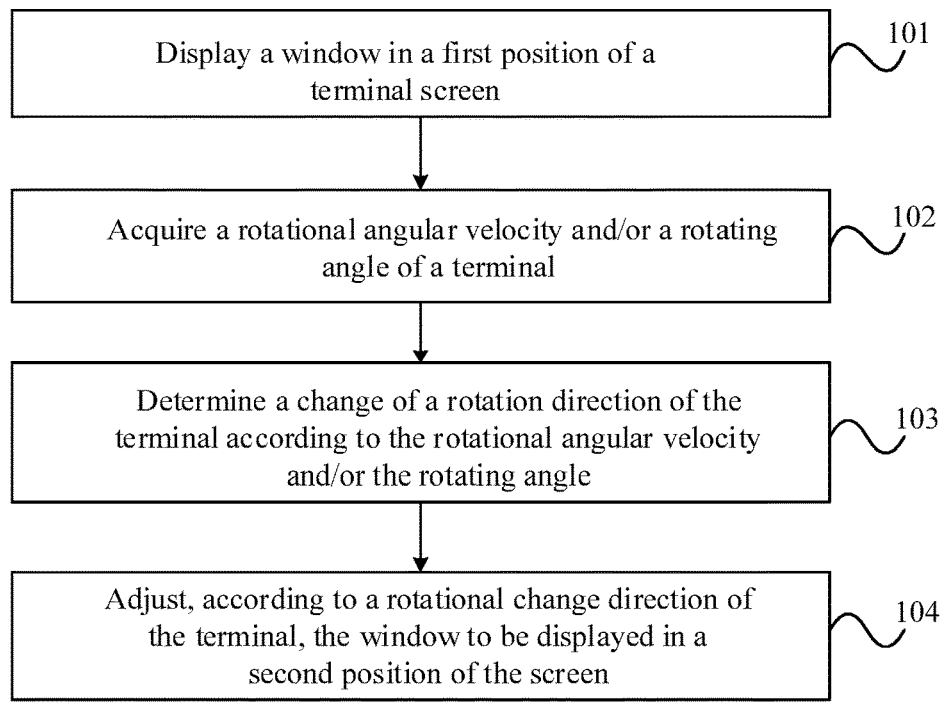
FIG. 1 is a flowchart of a method embodiment for adjusting a window display position according to the present disclosure.
Figure 2:
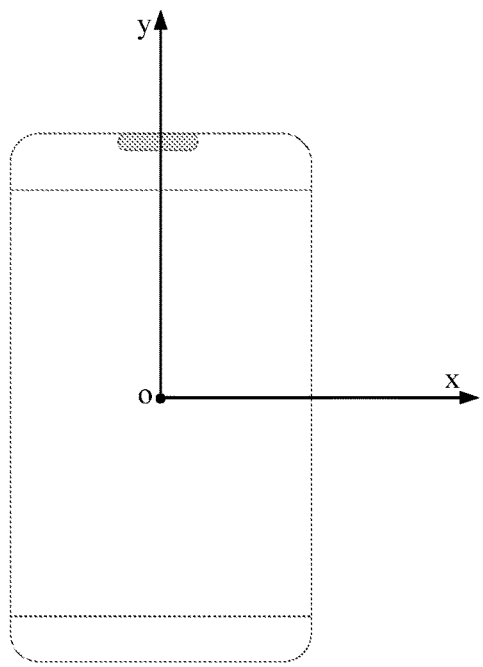
FIG. 2 is a schematic diagram 1 of adjusting a window display position according to a method embodiment of the present disclosure.
Figure 3:
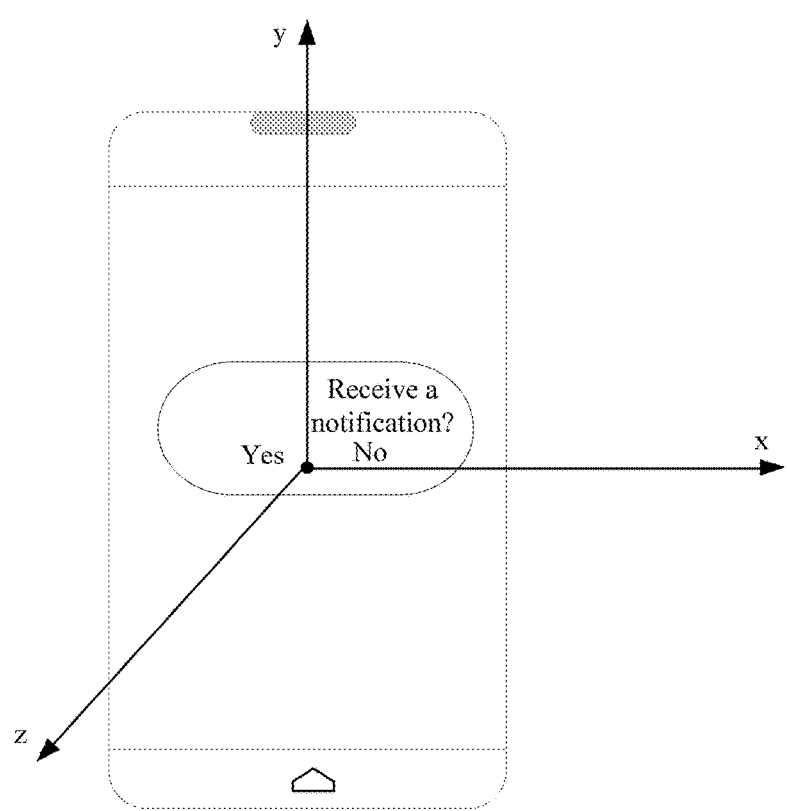
FIG. 3 is a schematic diagram 2 of adjusting a window display position according to a method embodiment of the present disclosure.
Figure 4:
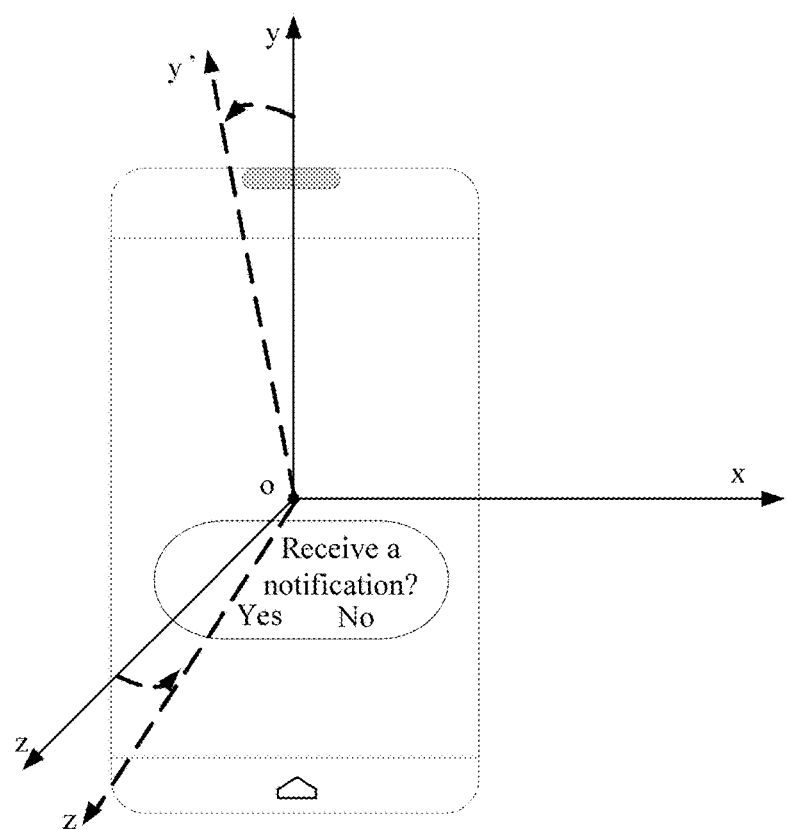
FIG. 4 is a schematic diagram 3 of adjusting a window display position according to a method embodiment of the present disclosure.
Figure 5:
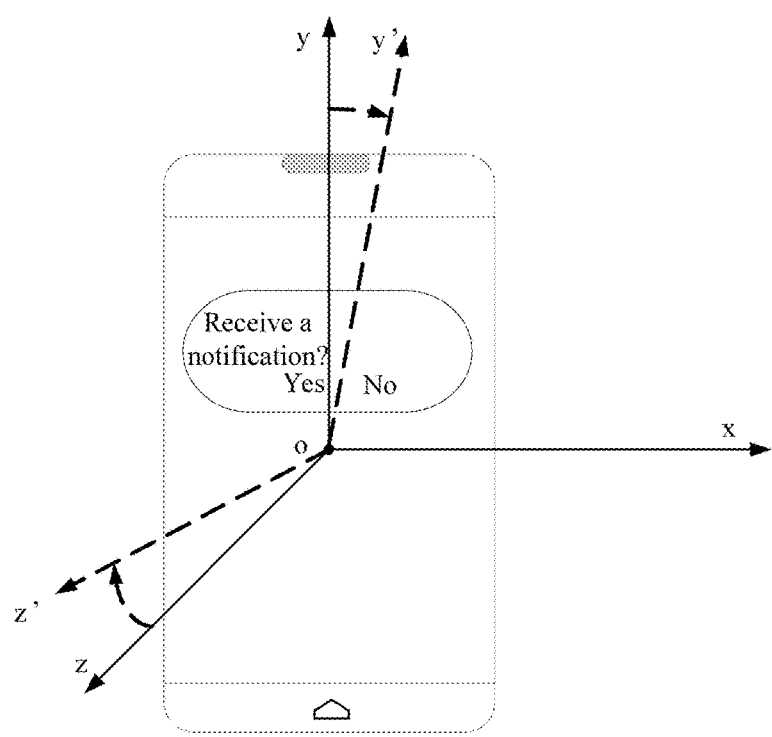
FIG. 5 is a schematic diagram 4 of adjusting a window display position according to a method embodiment of the present disclosure.

FIG. 1 is a flowchart of a method embodiment for adjusting a window display position according to the present disclosure. FIG. 2 is a schematic diagram 1 of adjusting a window display position according to the method embodiment of the present disclosure. FIG. 3 is a schematic diagram 2 of adjusting a window display position according to the method embodiment of the present disclosure. FIG. 4 is a schematic diagram 3 of adjusting a window display position according to the method embodiment of the present disclosure. FIG. 5 is a schematic diagram 4 of adjusting a window display position according to the method embodiment of the present disclosure. This embodiment may be executed by a terminal. The technical solution in this embodiment may be applied to a mobile terminal, and a view or window position is adjusted for a screen of the mobile terminal. As shown in FIG. 1, the method in this embodiment may include the following steps.

Step 101: Display a window in a first position of a terminal screen.

Step 102: Acquire a rotational angular velocity and/or a rotating angle of a terminal.

Step 103: Determine a change of a rotation direction of the terminal according to the rotational angular velocity and/or the rotating angle.

A popup window of an application program is first displayed in the first position of the terminal screen; the rotational angular velocity and/or the rotating angle of the terminal are/is acquired; and the change of the rotation direction of the terminal is determined according to the acquired rotational angular velocity and/or rotating angle.

For example, as shown in FIG. 2, the terminal is horizontally placed with a screen upwards. Directions of coordinates are shown in the figure, and a coordinate origin is a center point of the terminal screen. When the rotational angular velocity such as a rotational angular velocity around an x-axis direction is greater than a first preset rotational angular velocity threshold, it is defined that the terminal rotates counterclockwise around the x-axis, and then it is determined that a rotational change direction of the terminal is a downward direction; or when the rotational angular velocity such as a rotational angular velocity around an x-axis direction is less than a second preset rotational angular velocity threshold, it is defined that the terminal rotates clockwise around the x-axis, and then it is determined that a rotational change direction of the terminal is an upward direction; or when the rotating angle such as a rotating angle around an x-axis direction is greater than a first preset rotating angle threshold, it is defined that the terminal rotates counterclockwise around the x-axis, and then it is determined that a rotational change direction of the terminal is a downward direction; or when the rotating angle such as a rotating angle around an x-axis direction is less than a second preset rotating angle threshold, it is defined that the terminal rotates clockwise around the x-axis, and then it is determined that a rotational change direction of the terminal is an upward direction; or when the rotational angular velocity such as a rotational angular velocity around an x-axis direction is greater than a first preset rotational angular velocity threshold, it is defined that the terminal rotates counterclockwise around the x-axis, and in this case, if the rotating angle is also greater than a first preset rotating angle threshold, it is determined that a rotational change direction of the terminal is a downward direction; or when the rotational angular velocity such as a rotational angular velocity around an x-axis direction is less than a second preset rotational angular velocity threshold, it is defined that the terminal rotates clockwise around the x-axis, and in this case, if the rotating angle is also less than a second preset rotating angle threshold, it is determined that a rotational change direction of the terminal is an upward direction; or when the rotational angular velocity such as a rotational angular velocity around an x-axis direction is greater than a first preset rotational angular velocity threshold, it is defined that the terminal rotates counterclockwise around the x-axis, and in this case, if the rotating angle is less than a second preset rotating angle threshold, the rotation direction of the terminal is based on a direction of the rotational angular velocity, and then it is determined that a rotational change direction of the terminal is a downward direction; or when the rotational angular velocity such as a rotational angular velocity around an x-axis direction is less than a second preset rotational angular velocity threshold, it is defined that the terminal rotates clockwise around the x-axis, and in this case, if the rotating angle is greater than a first preset rotating angle threshold, the rotation direction of the terminal is based on a direction of the rotational angular velocity, and then it is determined that a rotational change direction of the terminal is an upward direction.

By increasing control of the rotating angle, shaking under an abnormal condition (an emergency brake or falling of a mobile phone) can be effectively prevented, thereby preventing misoperation.

The rotating angle in this embodiment may be obtained by multiplying the rotational angular velocity by a rotation time.

Step 104: Adjust, according to a rotational change direction of the terminal, the window to be displayed in a second position of the screen.

As shown in FIG. 3, the terminal is placed perpendicular to a horizontal plane. In the figure, an xoz plane is the horizontal plane, and the terminal screen faces a user. A window display position is adjusted according to the rotational change direction of the terminal. As shown in FIG. 4, the terminal is swung forwards, that is, the terminal is rotated around the x-axis, and the screen rotates in a direction approaching the user. That is, when the terminal rotates counterclockwise around the x-axis, a position of the popup window is moved downwards; and in this case, the terminal is perpendicular to the xoz' plane and parallel to an xoy' plane. The popup window moves by specific displacement, for example, may move to a position approaching a navigation bar at the bottom. In this case, if the terminal is swung in an opposite direction (the terminal is swung backwards), that is, the terminal rotates clockwise around the x-axis, the position of the popup window is moved upwards. In this embodiment of the present disclosure, an original position, for example, as a popup window position shown in FIG. 3, may be restored.

As shown in FIG. 3 and FIG. 5, the terminal is swung backwards, that is, the terminal is rotated around the x-axis in a clockwise direction, so that the terminal screen rotates in a direction away from the user. The position of the popup window is moved upwards. The terminal is further swung in an opposite direction and in a forward direction, thereof the terminal is rotated around the x-axis in a counterclockwise direction, and the screen rotates in a direction approaching the user. In this case, the terminal is perpendicular to the xoz' plane and parallel to the xoy' plane. In this embodiment of the present disclosure, the position of the popup window may be restored to the original position, as the popup window position shown in FIG. 3.

In this embodiment, a rotational angular velocity and/or a rotating angle of a terminal is acquired, a change of a rotation direction of the terminal is determined according to the rotational angular velocity and/or the rotating angle, and finally a window position is adjusted according to a rotational change direction of the terminal, thereby implementing a function of dynamically adjusting a window position according to a change of a rotation direction of a terminal. After the adjustment, a user operation is more convenient, and a problem in the prior art that it is inconvenient to perform an operation on a window of a terminal is resolved.

Figure 6:
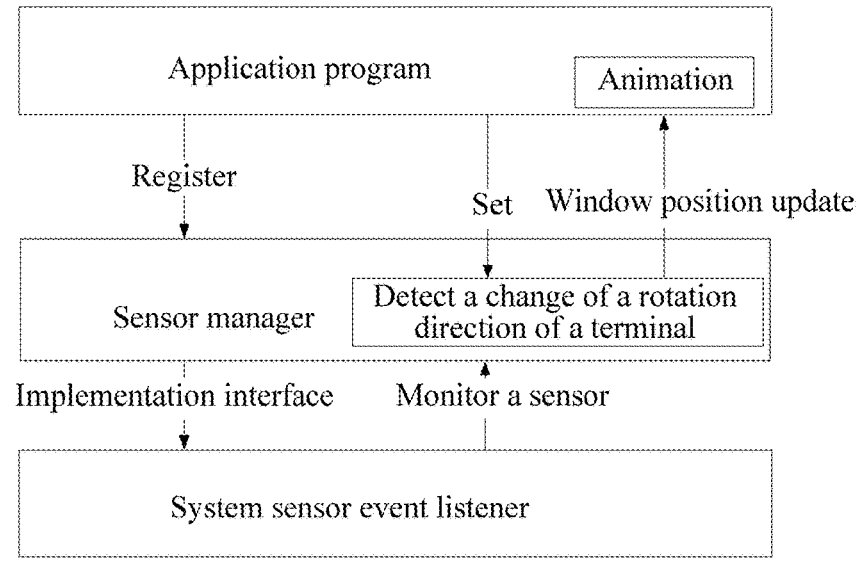
FIG. 6 is a schematic diagram of an implementation process of a method embodiment for adjusting a window display position according to the present disclosure.

FIG. 6 is a schematic diagram of an implementation process of a method embodiment for adjusting a window display position according to the present disclosure. In this embodiment, the rotational angular velocity is a rotational angular velocity ω_x around an x-axis direction, and the rotating angle is a rotating angle a_x around the x-axis direction.

In another embodiment of the present disclosure, the determining the change of the rotation direction of the terminal according to the rotational angular velocity and/or the rotating angle may include, when the rotational angular velocity around the x-axis direction is greater than a first preset rotational angular velocity threshold, determining that the terminal rotates counterclockwise around the x-axis and a rotational change direction of the terminal is a downward direction; or when the rotational angular velocity around the x-axis direction is less than a second preset rotational angular velocity threshold, determining that the terminal rotates clockwise around the x-axis and a rotational change direction of the terminal is an upward direction; or when the rotating angle around the x-axis direction is greater than a first preset rotating angle threshold, determining that the terminal rotates counterclockwise around the x-axis and a rotational change direction of the terminal is a downward direction; or when the rotating angle around the x-axis direction is less than a second preset rotating angle threshold, determining that the terminal rotates clockwise around the x-axis and a rotational change direction of the terminal is an upward direction; or when the rotational angular velocity around the x-axis direction and the rotating angle around the x-axis direction are greater than preset thresholds, determining that the terminal rotates counterclockwise around the x-axis and a rotational change direction of the terminal is a downward direction; or when the rotational angular velocity around the x-axis direction and the rotating angle around the x-axis direction are less than preset thresholds, determining that the terminal rotates clockwise around the x-axis and a rotational change direction of the terminal is an upward direction; or when the rotational angular velocity around the x-axis direction is greater than a first preset rotational angular velocity threshold, but the rotating angle around the x-axis direction is less than a second preset rotating angle threshold, or the rotational angular velocity around the x-axis direction is less than a second preset rotational angular velocity threshold, but the rotating angle around the x-axis direction is greater than a first preset rotating angle threshold, determining that the rotation direction of the terminal is based on a direction of the rotational angular velocity, that is, an adjustment of a window position is also based on the direction of the rotational angular velocity.

Optionally, the acquiring the rotational angular velocity and/or the rotating angle of the terminal includes acquiring the rotational angular velocity and/or the rotating angle of the terminal in real time or periodically by using a sensor.

The first preset rotational angular velocity threshold, second preset rotational angular velocity threshold, first preset rotating angle threshold, and second preset rotating angle threshold may be preset by the terminal, and a value may be set according to an empirical value. For example, the first preset rotational angular velocity threshold is equal to πrad/s; the second preset rotational angular velocity threshold is equal to −πrad/s; the first preset rotating angle threshold is equal to 30°, and the second preset rotating angle threshold is −30°.

The rotational angular velocity ω_x and/or the rotating angle a_x around the x-axis direction of the terminal are/is acquired by using a gyro sensor, where a_x is equal to a sum of angles by which the terminal rotates and are detected by the gyro sensor.

ω_x=event.values[0]; where event is an event object of a sensor event, SensorEvent; event.values indicates an angular velocity of rotation of the sensor event (that is, an angular velocity of the rotation of the terminal), which includes an angular velocity ω_x rotating around the x-axis and an angular velocity ω_y rotating around the y-axis; and event.values[0] indicates an angular velocity value in a unit of radian per second (rad/s) rotating around the x-axis.

A calculation formula for the rotating angle a_x rotating around the x-axis is as follows:

$$a\_x = \Sigma(\omega\_x * dt * NANON\_TO\_SECOND\_UNITs);$$

where dt indicates a time interval in a unit of nanosecond (ns) between two detections performed by the sensor, for example, the gyro sensor detects the angular velocity of the rotation of the terminal once every 10 ns; NANON_TO_SECOND_UNITs is a constant value equal to 1/1000000000.0, and time is converted from a nanosecond to a second.

The terminal is placed perpendicular to a horizontal plane with a terminal screen facing a user, and a window position is adjusted according to the rotational change direction of the terminal is a leftward direction. As shown in FIG. 4, when the terminal rotates forwards, that is, rotates counter-clockwise around the x-axis, the terminal screen rotates in a direction approaching the user, and $\omega\_x$ and $a\_x$ are both positive values. When $\omega\_x > \Omega$ and/or $a\_x > \Theta$, it is defined that the rotational change direction of the terminal is a downward direction, which indicates that a window of the terminal screen will trigger an up-to-down movement. Conversely, as shown in FIG. 5, when $\omega\_x < -\Omega$ and/or $a\_x < -\Theta$, it indicates that the terminal rotates around the x-axis in a backward direction, that is, rotates clockwise around the x-axis; and in this case, it is defined that the rotational change direction of the terminal is an upward direction, which indicates that the window of the terminal screen will trigger an down-to-up movement.

When $\omega\_x > \Omega$ and $a\_x < -\Theta$, a direction of $\omega\_x$ prevails, and it is defined that the rotational change direction of the terminal is a downward direction, which indicates that the window of the terminal screen will trigger an up-to-down movement; or when $\omega\_x < -\Omega$ and $a\_x > \Theta$, the direction of $\omega\_x$ also prevails, and it is defined that the rotational change direction of the terminal is an upward direction, which indicates that the window of the terminal screen will trigger an down-to-up movement.

The $\Omega$ indicates a threshold for the rotational angular velocity $\omega\_x$ at which the rotation direction of the terminal changes, that is, the first preset rotational angular velocity threshold, and $\Omega = 2\pi/T$, where T indicates a time for the terminal to rotate one circle, and $\Omega$ may be determined according to the time for the terminal to rotate one circle. A default time for rotating one circle is 1 second (s). The user may also set T personally, and generally $\Omega$ takes a value of $\pi$ rad/s; $-\Omega$ indicates the second preset rotational angular velocity threshold at which the rotation direction of the terminal changes.

The $\Theta$ indicates a threshold for the rotating angle $a\_x$ at which the direction changes, that is, the first rotating angle threshold, and a default value is 45°. The user may define the threshold personally by using an application. To ensure sensitivity of a response, the threshold is generally set to 20°-30°; $-\Theta$ indicates the second rotating angle threshold at which the direction changes.

The rotational angular velocity and/or the rotating angle are/is acquired in real time or periodically by using the sensor; the change of the rotation direction of the terminal is determined according to the rotational angular velocity and/or the rotating angle; and the rotational change direction of the terminal is acquired.

Finally, updating of a display position of the popup window is dynamically driven according to the rotational change direction of the terminal, and the popup window is displayed in the second position of the terminal screen. For example, the terminal is rotated forwards, and the window is moved downwards; the terminal is rotated backwards, and the window is moved upwards.

When position updating is performed, an animated effect may be further added. For example, in a process of adjusting a window position, an implementation manner of first rapidly accelerating and then decelerating is used, which implements an effect that a moving window brakes in an accelerating manner. When the window is adjusted to a final position, a resilient effect similar to a spring is added.

In this embodiment of the present disclosure, as shown in FIG. 6, an application program is various application programs installed in a terminal, such as a game. After being started, the application program can dynamically adjust a view or a window position according to rotation of the terminal. Views or windows of the various application programs are displayed in a first position of a terminal screen. A sensor manager is a software program in the terminal and used to monitor a gyro sensor, acquire a rotational angular velocity and/or a rotating angle of the terminal, determine a change of a rotation direction of the terminal, and adjust, according to a rotational change direction of the terminal, a window of the application program to be displayed in a second position of the terminal screen. A system sensor event listener is an implementation interface of the sensor manager. For example, the various application programs in the terminal need to register a gyro sensor with a system of the terminal. If registration is successful, the gyro sensor may be monitored by using another software program such as sensor manager (HwSensorManager), and therefore a sensor event (SensorEvent) is detected; that is, the rotational angular velocity and/or the rotating angle of the terminal may be acquired, and the change of the rotation direction of the terminal is detected. After registering the gyro sensor successfully, the application program may further set to start monitoring of the terminal. After detecting the change of the rotation direction of the terminal, the sensor manager may update a display position of a popup window or a view of the application program, and may implement dynamic display position adjustment by using an animated effect. The implementation interface of the sensor manager of the software program may be implemented by using the system sensor event listener (SensorEventListener). The gyro sensor is monitored, and therefore the change of the rotation direction of the terminal is detected.

Optionally, the rotational angular velocity is a rotational angular velocity $\omega\_x$ around an x-axis direction and a rotational angular velocity $\omega\_y$ around a y-axis direction, and the rotating angle is a rotating angle $a\_x$ around the x-axis direction and a rotating angle $a\_y$ around the y-axis direction.

The determining the change of the rotation direction of the terminal according to the rotational angular velocity and/or the rotating angle includes, when an absolute value of the rotational angular velocity around the x-axis direction is greater than an absolute value of the rotational angular velocity around the y-axis direction, that is, $|\omega\_x| > |\omega\_y|$, and the rotational angular velocity around the x-axis direction and the rotating angle around the x-axis direction are respectively greater than a first preset rotational angular velocity threshold and a first preset rotating angle threshold, determining that the terminal rotates counterclockwise around the x-axis and the rotational change direction of the terminal is a downward direction; or when an absolute value of the rotational angular velocity around the x-axis direction is greater than an absolute value of the rotational angular velocity around the y-axis direction, that is, $|\omega\_x| > |\omega\_y|$, and the rotational angular velocity around the x-axis direction and the rotating angle around the x-axis direction are respectively less than a second preset rotational angular velocity threshold and a second preset rotating angle threshold, determining that the terminal rotates clockwise around the x-axis and the rotational change direction of the terminal is an upward direction; or when an absolute value of the rotational angular velocity around the x-axis direction is greater than an absolute value of the rotational angular velocity around the y-axis direction, that is, $|\omega\_x| > |\omega\_y|$, and when the rotating angle around the x-axis direction is greater than a first preset rotating angle threshold, determining that the terminal rotates counterclockwise around the x-axis and the rotational change direction of the terminal is a downward direction; or when the rotating angle around the x-axis direction is less than a second preset rotating angle threshold, determining that the terminal rotates clockwise around the x-axis and the rotational change direction of the terminal is an upward direction; or when an absolute value of the rotational angular velocity around the x-axis direction is greater than an absolute value of the rotational angular velocity around the y-axis direction, that is, $|\omega\_x|>|\omega\_y|$, and when the rotational angular velocity around the x-axis direction is greater than a first preset rotational angular velocity threshold, determining that the terminal rotates counterclockwise around the x-axis and the rotational change direction of the terminal is a downward direction; or when the rotational angular velocity around the x-axis direction is less than a second preset rotational angular velocity threshold, determining that the terminal rotates clockwise around the x-axis and the rotational change direction of the terminal is an upward direction; or when an absolute value of the rotational angular velocity around the x-axis direction is greater than an absolute value of the rotational angular velocity around the y-axis direction, that is, $|\omega\_x|>|\omega\_y|$, and when the rotational angular velocity around the x-axis direction is greater than a first preset rotational angular velocity threshold, but the rotating angle around the x-axis direction is less than a second preset rotating angle threshold, or when the rotational angular velocity around the x-axis direction is less than a second preset rotational angular velocity threshold, but the rotating angle around the x-axis direction is greater than a first preset rotating angle threshold, determining that the rotation direction of the terminal is based on a direction of the rotational angular velocity, that is, an adjustment of a window position is also based on the direction of the rotational angular velocity; or when an absolute value of the rotational angular velocity around the y-axis direction is greater than an absolute value of the rotational angular velocity around the x-axis direction, that is, $|\omega\_y|>|\omega\_x|$, and the rotational angular velocity around the y-axis direction and the rotating angle around the y-axis direction are respectively greater than a first preset rotational angular velocity threshold and a first preset rotating angle threshold, determining that the terminal rotates counterclockwise around the y-axis and the rotational change direction of the terminal is a rightward direction; or when an absolute value of the rotational angular velocity around the y-axis direction is greater than an absolute value of the rotational angular velocity around the x-axis direction, that is, $|\omega\_y|>|\omega\_x|$, and the rotational angular velocity around the y-axis direction and the rotating angle around the y-axis direction are respectively less than a second preset rotational angular velocity threshold and a second preset rotating angle threshold, determining that the terminal rotates clockwise around the y-axis and the rotational change direction of the terminal is a leftward direction; or when an absolute value of the rotational angular velocity around the y-axis direction is greater than an absolute value of the rotational angular velocity around the x-axis direction, that is, $|\omega\_y|>|\omega\_x|$, and when the rotating angle around the y-axis direction is greater than a first preset rotating angle threshold, determining that the terminal rotates counterclockwise around the y-axis and the rotational change direction of the terminal is a rightward direction; or when the rotating angle around the y-axis direction is less than a second preset rotating angle threshold, determining that the terminal rotates clockwise around the y-axis and the rotational change direction of the terminal is a leftward direction; or when an absolute value of the rotational angular velocity around the y-axis direction is greater than an absolute value of the rotational angular velocity around the x-axis direction, that is, $|\omega\_y|>|\omega\_x|$, and when the rotational angular velocity around the y-axis direction is greater than a first preset rotational angular velocity threshold, determining that the terminal rotates counterclockwise around the y-axis and the rotational change direction of the terminal is a rightward direction; or when the rotational angular velocity around the y-axis direction is less than a second preset rotational angular velocity threshold, determining that the terminal rotates clockwise around the y-axis and the rotational change direction of the terminal is a leftward direction; or when an absolute value of the rotational angular velocity around the y-axis direction is greater than an absolute value of the rotational angular velocity around the x-axis direction, that is, $|\omega\_y|>|\omega\_x|$, and when the rotational angular velocity around the y-axis direction is greater than a first preset rotational angular velocity threshold, but the rotating angle around the y-axis direction is less than a second preset rotating angle threshold, or when the rotational angular velocity around the y-axis direction is less than a second preset rotational angular velocity threshold, but the rotating angle around the y-axis direction is greater than a first preset rotating angle threshold, determining that the rotation direction of the terminal is based on a direction of the rotational angular velocity, that is, an adjustment of a window position is also based on the direction of the rotational angular velocity.

In the technical solution, position adjustment may be performed based on a popup window of a general large-screen mobile phone. On devices such as a super large-screen mobile phone and tablet computer, a position of a window may further be adjusted in four directions, that is, upwards, downwards, leftwards, and rightwards.

The rotational angular velocity $\omega\_x$ around the x-axis direction and the rotational angular velocity $\omega\_y$ around the y-axis, and/or the rotating angles $a\_x$ and $a\_y$ of the rotation of the terminal are acquired by using a gyro sensor, where $a\_x$ is equal to a sum of angles by which the terminal rotates around the x-axis and are detected by the gyro sensor, and $a\_y$ is equal to a sum of angles by which the terminal rotates around the y-axis and are detected by the gyro sensor.

$\omega\_y$=event.values[1]; where event is an object of a sensor event (SensorEvent); event.values indicates an angular velocity of rotation of the sensor event, which includes an angular velocity $\omega\_x$ rotating around the x-axis and an angular velocity $\omega\_y$ rotating around the y-axis; event.values[0] indicates an angular velocity value in a unit of radian per second (rad/s) rotating around the x-axis; and event.values[1] indicates an angular velocity value in a unit of radian per second (rad/s) rotating around the y-axis.

Calculation of the angle $a\_y$ rotating around the y-axis:

$$a\_y=\Sigma(\omega\_y*dt*\text{NANON\_TO\_SECOND\_UNITs});$$

where dt indicates a time interval in a unit of nanosecond (ns) between two detections performed by the sensor, and NANON_TO_SECOND_UNITs is a constant value equal to 1/1000000000.0f, and time is converted from a nanosecond to a second.

When the sensor detects that an angular velocity value of the rotation of the terminal is $|\omega\_x|>|\omega\_y|$, that is, the angular velocity rotating around the x-axis is greater than the angular velocity rotating around the y-axis, and in this case, the rotation direction of the terminal changes between up and down, that is, the terminal rotates around the x-axis. When $\omega\_x>\Omega$ and/or $a\_x>\Theta$, it is defined that the rotation direction of the terminal is a downward direction, which indicates that a window of the terminal screen will trigger an up-to-down movement; conversely, when $\omega\_x<-\Omega$ and/or $a\_x<-\Theta$, it indicates that the terminal rotates around the x-axis in a backward direction, and in this case, it is defined that the rotation direction of the terminal is an upward direction (as shown in FIG. 3 and FIG. 4).

When the sensor detects that an angular velocity value of the rotation of the terminal is $|\omega\_y|>|\omega\_x|$, that is, the angular velocity rotating around the y-axis is greater than the angular velocity rotating around the x-axis, and in this case, the rotation direction of the terminal changes between left and right, that is, the terminal rotates around the y-axis. When $\omega\_y>\Omega$ and/or $a\_y>0$, it is defined that the rotation direction of the terminal is a rightward direction (along a direction indicated by an arrow of the x-axis), that is, rotates counterclockwise around the y-axis, and a position of a window is moved rightwards; conversely, when $\omega\_y<-\Omega$ and/or $a\_y<-\Theta$, it indicates that the terminal rotates around the y-axis in a leftward direction (along a direction opposite to the arrow of the x-axis in the figure), that is, rotates clockwise around the y-axis, and in this case, it is defined that the rotation direction of the terminal is a leftward direction, and the position of the window is moved leftwards.

When $\omega\_y>\Omega$ and $a\_y<-\Theta$, a direction of $\omega\_y$ prevails, and it is defined that the rotational change direction of the terminal is a rightward direction, which indicates that the window of the terminal screen will trigger a left-to-right movement; or when $\omega\_y<\Omega$ and $a\_y>\Theta$, the direction of $\omega\_y$ also prevails, and it is defined that the rotational change direction of the terminal is a leftward direction, which indicates that the window of the terminal screen will trigger a right-to-left movement.

The rotational angular velocity and the rotating angle are acquired in real time or periodically by using the sensor; the change of the rotation direction of the terminal is determined according to the rotational angular velocity and the rotating angle; and the rotational change direction of the terminal is acquired.

Finally, updating of the position of the popup window is dynamically driven according to the rotational change direction of the terminal. For example, the terminal rotates leftwards, and the window moves leftwards; the terminal rotates rightwards, and the window moves rightwards; if the terminal is rotated forwards, the window moves downwards; and if the terminal is rotated backwards, the window moves upwards.

By increasing control of the rotating angle, shaking under an abnormal condition (an emergency brake or falling of a mobile phone) can be effectively prevented, thereby preventing misoperation.

In this embodiment of the present disclosure, before adjusting, according to the rotational change direction of the terminal, the window to be displayed in the second position of the screen, the method may further include presetting displacement by which the window moves.

Then adjusting, according to the rotational change direction of the terminal, the window to be displayed in a second position of the screen includes moving the window of the terminal by the displacement towards the rotational change direction, and adjusting the window to be displayed in the second position of the screen.

Before dynamically driving updating of the display position of the popup window according to the rotational change direction of the terminal, the displacement by which the window moves may be preset, for example, it is set that the window moves by 1 cm, or moves to an edge of the screen. For example, when the position of the popup window moves downwards, the popup window moves to a position approaching a navigation bar at the bottom.

For example, the terminal rotates counterclockwise around the x-axis, and then as shown in FIG. 4, the window position is adjusted to move downwards, and movement displacement is equal to the preset displacement; if the terminal rotates counterclockwise around the y-axis, and then the window position is adjusted to move rightwards, and movement displacement is equal to the preset displacement.

The solution in this embodiment of the present disclosure may not only implement a change of a position of a small window, but also may be used in a view. For example, when there is too much content in a list, downward movement and restoration of a list view are implemented, that is, in the case of forward shaking, the list view moves downwards; and in the case of further swing backwards, a position of the list view is restored to an original position.

In this embodiment, by acquiring a rotational angular velocity and/or a rotating angle of a terminal, determining a change of a rotation direction of the terminal according to the rotational angular velocity and/or the rotating angle, and finally adjusting a window position according to a rotational change direction of the terminal, a function of dynamically adjusting a window position according to a change of a rotation direction of a terminal is implemented. After the adjustment, a user operation is more convenient, and a problem in the prior art that it is inconvenient to perform an operation on a window of a terminal is resolved.

In another embodiment of the present disclosure, the terminal rotates counterclockwise around the x-axis multiple circles, and then continues to rotate clockwise; and in this case, if $\omega\_x<\Omega$ and $a\_x>\Theta$, then the position of the window is adjusted from down to up in this case, that is, a direction of $\omega\_x$ prevails. Conversely, the terminal rotates clockwise around the x-axis multiple circles, and then continues to rotate counterclockwise; and in this case, $a\_x<-\Theta$ and $\omega\_x>\Omega$, and then the position of the window is adjusted from up to down in this case, that is, a direction of $\omega\_x$ prevails.

Figure 7:
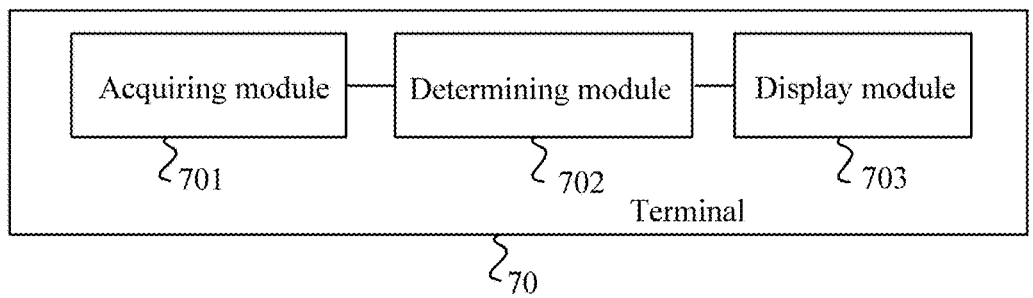
FIG. 7 is a schematic structural diagram of an embodiment of a terminal according to the present disclosure.

FIG. 7 is a schematic structural diagram of an embodiment of a terminal according to the present disclosure. As shown in FIG. 7, a terminal 70 provided in this embodiment includes an acquiring module 701, a determining module 702, and a display module 703; where the acquiring module 701 is configured to acquire a rotational angular velocity and/or a rotating angle of the terminal; the determining module 702 is configured to determine a change of a rotation direction of the terminal according to the rotational angular velocity and/or the rotating angle; the display module 703 is configured to display a window in a first position of a terminal screen; and the display module 703 is further configured to adjust, according to a rotational change direction of the terminal, the window to be displayed in a second position of the screen.

The display module 703 first displays a popup window of an application program in the first position of the terminal screen; the acquiring module 701 acquires the rotational angular velocity and/or the rotating angle of the terminal, and when the acquiring module 701 acquires the rotational angular velocity and/or the rotating angle, the determining module 702 determines the change of the rotation direction of the terminal according to the acquired rotational angular velocity and/or rotating angle; and finally, the display module 703 displays the popup window in the second position of the screen.

Optionally, in a possible implementation manner of this embodiment, the rotational angular velocity is a rotational angular velocity around an x-axis direction, and the rotating angle is a rotating angle around the x-axis direction.

The determining module 702 is configured to, when the rotational angular velocity around the x-axis direction and the rotating angle around the x-axis direction are respectively greater than a first preset rotational angular velocity threshold and a first preset rotating angle threshold, determine that the terminal rotates counterclockwise around the x-axis and the rotational change direction of the terminal is a downward direction; or when the rotational angular velocity around the x-axis direction and the rotating angle around the x-axis direction are respectively less than a second preset rotational angular velocity threshold and a second preset rotating angle threshold, determine that the terminal rotates clockwise around the x-axis and the rotational change direction of the terminal is an upward direction.

Optionally, in a possible implementation manner of this embodiment, the rotational angular velocity is a rotational angular velocity around an x-axis direction and a rotational angular velocity around a y-axis direction, and the rotating angle is a rotating angle around the x-axis direction and a rotating angle around the y-axis direction.

The determining module 702 is configured to, when an absolute value of the rotational angular velocity around the x-axis direction is greater than an absolute value of the rotational angular velocity around the y-axis direction, and the rotational angular velocity around the x-axis direction and the rotating angle around the x-axis direction are respectively greater than a first preset rotational angular velocity threshold and a first preset rotating angle threshold, determine that the terminal rotates counterclockwise around the x-axis and the rotational change direction of the terminal is a downward direction; or when an absolute value of the rotational angular velocity around the x-axis direction is greater than an absolute value of the rotational angular velocity around the y-axis direction, and the rotational angular velocity around the x-axis direction and the rotating angle around the x-axis direction are respectively less than a second preset rotational angular velocity threshold and a second preset rotating angle threshold, determine that the terminal rotates clockwise around the x-axis and the rotational change direction of the terminal is an upward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively greater than a first preset rotational angular velocity threshold and a first preset rotating angle threshold, determine that the terminal rotates counterclockwise around the y-axis and the rotational change direction of the terminal is a rightward direction; or when an absolute value of the rotational angular velocity around the y-axis direction is greater than an absolute value of the rotational angular velocity around the x-axis direction, and when the rotational angular velocity around the y-axis direction and the rotating angle around the y-axis direction are respectively less than a second preset rotational angular velocity threshold and a second preset rotating angle threshold, determine that the terminal rotates clockwise around the y-axis and the rotational change direction of the terminal is a leftward direction.

Optionally, in a possible implementation manner of this embodiment, the determining module 702 is further configured to preset displacement by which the window moves.

Optionally, the display module 703 is configured to move the window of the terminal towards the rotational change direction by the displacement, and adjust the window to be displayed in the second position of the screen.

Optionally, the acquiring module 701 is configured to acquire the rotational angular velocity and/or the rotating angle of the terminal in real time or periodically by using a sensor.

The terminal in this embodiment may be used to implement the technical solution in any method embodiment, and implementation principles and technical effects of solution are similar, and details are not described herein again.

Figure 8:
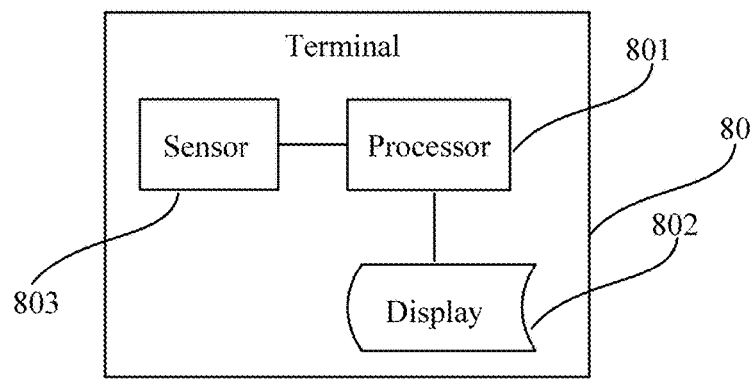
FIG. 8 is a schematic structural diagram of another embodiment of a terminal according to the present disclosure.

FIG. 8 is a schematic structural diagram of another embodiment of a terminal according to the present disclosure. As shown in FIG. 8, a terminal 80 provided in this embodiment includes a processor 801, a display 802, and a sensor 803.

The display 802 is configured to display a window in a first position.

The sensor 803 is configured to acquire a rotational angular velocity and/or a rotating angle of the terminal.

The processor 801 is configured to determine a change of a rotation direction of the terminal according to the rotational angular velocity and/or the rotating angle that are/is acquired by the sensor 803.

The display 802 is further configured to adjust, according to a rotational change direction of the terminal, the window to be displayed in a second position.

Optionally, in a possible implementation manner of this embodiment, the sensor 803 is further configured to acquire a rotational angular velocity around an x-axis direction and/or a rotating angle around the x-axis direction of the terminal.

The processor 801 is further configured to, when the rotational angular velocity around the x-axis direction and the rotating angle around the x-axis direction are respectively greater than a first preset rotational angular velocity threshold and a first preset rotating angle threshold, determine that the terminal rotates counterclockwise around the x-axis and the rotational change direction of the terminal is a downward direction; or when the rotational angular velocity around the x-axis direction and the rotating angle around the x-axis direction are respectively less than a second preset rotational angular velocity threshold and a second preset rotating angle threshold, determine that the terminal rotates clockwise around the x-axis and the rotational change direction of the terminal is an upward direction.

Optionally, in a possible implementation manner of this embodiment, the sensor 803 is further configured to acquire a rotational angular velocity around an x-axis direction and a rotational angular velocity around a y-axis direction, and/or a rotating angle around the x-axis direction and a rotating angle around the y-axis direction of the terminal.

The processor 801 is further configured to, when an absolute value of the rotational angular velocity around the x-axis direction is greater than an absolute value of the rotational angular velocity around the y-axis direction, and the rotational angular velocity around the x-axis direction and the rotating angle around the x-axis direction are respectively greater than a first preset rotational angular velocity threshold and a first preset rotating angle threshold, determine that the terminal rotates counterclockwise around the x-axis and the rotational change direction of the terminal is a downward direction; or when an absolute value of the rotational angular velocity around the x-axis direction is greater than an absolute value of the rotational angular velocity around the y-axis direction, and the rotational angular velocity around the x-axis direction and the rotating angle around the x-axis direction are respectively less than a second preset rotational angular velocity threshold and a second preset rotating angle threshold, determine that the terminal rotates clockwise around the x-axis and the rotational change direction of the terminal is an upward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively greater than a first preset rotational angular velocity threshold and a first preset rotating angle threshold, determine that the terminal rotates counterclockwise around the y-axis and the rotational change direction of the terminal is a rightward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively less than a second preset rotational angular velocity threshold and a second preset rotating angle threshold, determine that the terminal rotates clockwise around the y-axis and the rotational change direction of the terminal is a leftward direction.

Optionally, in a possible implementation manner of this embodiment, the processor 801 is further configured to preset displacement by which the window moves.

Optionally, the display 802 is further configured to move the window of the terminal towards the rotational change direction by the displacement, and adjust the window to be displayed in the second position.

The terminal in this embodiment may be used to implement the technical solution in any method embodiment, and implementation principles and technical effects of the solution are similar, and details are not described herein again.

Figure 9:
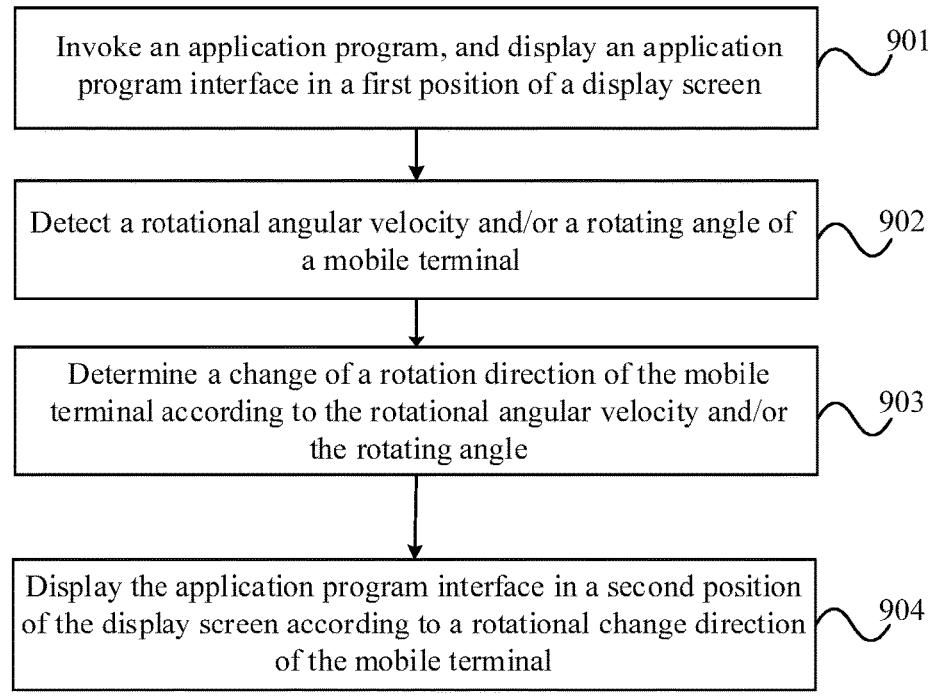
FIG. 9 is a schematic diagram of an interface display method according to an embodiment of the present disclosure.

FIG. 9 is a schematic diagram of an interface display method according to an embodiment of the present disclosure, where the method is applied to a mobile terminal, and the mobile terminal includes a display screen and an application program. The method includes the following steps.

Step 901: Invoke the application program, and display the application program interface in a first position of the display screen.

Step 902: Detect a rotational angular velocity and/or a rotating angle of the mobile terminal.

Step 903: Determine a change of a rotation direction of the mobile terminal according to the rotational angular velocity and/or the rotating angle.

Step 904: Display the application program interface in a second position of the display screen according to a rotational change direction of the mobile terminal.

The mobile terminal first invokes the application program in the mobile terminal, and displays the application program interface in the first position of the display screen of the mobile terminal; and then detects the rotational angular velocity and/or the rotating angle of the mobile terminal, and determines the change of the rotation direction of the mobile terminal according to the detected rotational angular velocity and/or rotating angle; and finally displays the application program interface in the second position of the display screen according to the rotational change direction of the mobile terminal.

In another embodiment of the present disclosure, the rotational angular velocity is a rotational angular velocity around an x-axis direction, and the rotating angle is a rotating angle around the x-axis direction.

The determining a change of a rotation direction of the mobile terminal according to the rotational angular velocity and/or the rotating angle includes, when the rotational angular velocity around the x-axis direction and the rotating angle around the x-axis direction are respectively greater than a first preset rotational angular velocity threshold and a first preset rotating angle threshold, determining that the mobile terminal rotates counterclockwise around the x-axis and the rotational change direction of the mobile terminal is a downward direction; or when the rotational angular velocity around the x-axis direction and the rotating angle around the x-axis direction are respectively less than a second preset rotational angular velocity threshold and a second preset rotating angle threshold, determining that the mobile terminal rotates clockwise around the x-axis and the rotational change direction of the mobile terminal is an upward direction.

In another embodiment of the present disclosure, the rotational angular velocity is a rotational angular velocity around an x-axis direction and a rotational angular velocity around a y-axis direction, and the rotating angle is a rotating angle around the x-axis direction and a rotating angle around the y-axis direction.

The determining a change of a rotation direction of the mobile terminal according to the rotational angular velocity and/or the rotating angle includes, when an absolute value of the rotational angular velocity around the x-axis direction is greater than an absolute value of the rotational angular velocity around the y-axis direction, and the rotational angular velocity around the x-axis direction and the rotating angle around the x-axis direction are respectively greater than a first preset rotational angular velocity threshold and a first preset rotating angle threshold, determining that the mobile terminal rotates counterclockwise around the x-axis and the rotational change direction of the mobile terminal is a downward direction; or when an absolute value of the rotational angular velocity around the x-axis direction is greater than an absolute value of the rotational angular velocity around the y-axis direction, and the rotational angular velocity around the x-axis direction and the rotating angle around the x-axis direction are respectively less than a second preset rotational angular velocity threshold and a second preset rotating angle threshold, determining that the mobile terminal rotates clockwise around the x-axis and the rotational change direction of the mobile terminal is an upward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively greater than a first preset rotational angular velocity threshold and a first preset rotating angle threshold, determining that the mobile terminal rotates counterclockwise around the y-axis and the rotational change direction of the mobile terminal is a rightward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively less than a second preset rotational angular velocity threshold and a second preset rotating angle threshold, determining that the mobile terminal rotates clockwise around the y-axis and the rotational change direction of the mobile terminal is a leftward direction.

In another embodiment of the present disclosure, before the displaying the application program interface in a second position of the display screen according to a rotational change direction of the mobile terminal, the method includes presetting displacement by which the application program interface moves.

In another embodiment of the present disclosure, the displaying the application program interface in a second position of the display screen according to a rotational change direction of the mobile terminal includes moving the application program interface of the mobile terminal towards the rotational change direction by the displacement, and displaying the application program interface in the second position of the display screen.

In the embodiment of the interface display method according to the present disclosure, the application program is invoked, and the application program interface is displayed in a first position of the display screen; a rotational angular velocity and/or a rotating angle of the mobile terminal are/is detected; a change of a rotation direction of the mobile terminal is determined according to the rotational angular velocity and/or the rotating angle; and the application program interface is displayed in a second position of the display screen according to a rotational change direction of the mobile terminal, so that a function of dynamically adjusting a window display position is implemented, and an application program interface after a window adjustment is displayed on the display screen. After the adjustment, a user operation is more convenient and user experience is improved.

Figure 10:
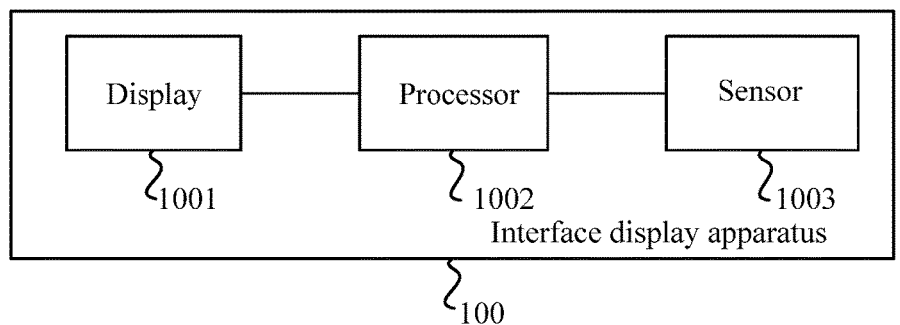
FIG. 10 is a schematic diagram of an interface display apparatus according to an embodiment of the present disclosure.

FIG. 10 is a schematic diagram of an interface display apparatus according to an embodiment of the present disclosure. The interface display apparatus 100 includes a display 1001, a processor 1002, and a sensor 1003.

The display 1001 is configured to display an application program interface in a first position of the display 1001.

The sensor 1003 is configured to detect a rotational angular velocity and/or a rotating angle of the apparatus.

The processor 1002 is configured to determine a change of a rotation direction of the apparatus according to the rotational angular velocity and/or the rotating angle.

The display 1001 is further configured to display the application program interface in a second position of the display 1001 according to a rotational change direction of the apparatus.

The application program interface is displayed in the first position of the display 1001 of the interface display apparatus 100, and the rotational angular velocity and/or the rotating angle of the apparatus are/is detected by using the sensor 1003; after the rotational angular velocity and/or the rotating angle are/is detected, the processor 1002 determines the change of the rotation direction of the apparatus according to the detected rotational angular velocity and/or rotating angle; and finally the application program interface is displayed in the second position of the display 1001 according to the rotational change direction of the apparatus.

In another embodiment of the present disclosure, the sensor 1003 is further configured to detect a rotational angular velocity around an x-axis direction and/or a rotating angle around the x-axis direction of the apparatus.

The processor 1002 is further configured to, when the rotational angular velocity around the x-axis direction and the rotating angle around the x-axis direction are respectively greater than a first preset rotational angular velocity threshold and a first preset rotating angle threshold, determine that the apparatus rotates counterclockwise around the x-axis and the rotational change direction of the apparatus is a downward direction; or when the rotational angular velocity around the x-axis direction and the rotating angle around the x-axis direction are respectively less than a second preset rotational angular velocity threshold and a second preset rotating angle threshold, determine that the apparatus rotates clockwise around the x-axis and the rotational change direction of the apparatus is an upward direction.

In another embodiment of the present disclosure, the sensor 1003 is further configured to detect a rotational angular velocity around an x-axis direction and a rotational angular velocity around a y-axis direction, and/or a rotating angle around the x-axis direction and a rotating angle around the y-axis direction of the terminal.

The processor 1002 is further configured to, when an absolute value of the rotational angular velocity around the x-axis direction is greater than an absolute value of the rotational angular velocity around the y-axis direction, and the rotational angular velocity around the x-axis direction and the rotating angle around the x-axis direction are respectively greater than a first preset rotational angular velocity threshold and a first preset rotating angle threshold, determine that the terminal rotates counterclockwise around the x-axis and the rotational change direction of the terminal is a downward direction; or when an absolute value of the rotational angular velocity around the x-axis direction is greater than an absolute value of the rotational angular velocity around the y-axis direction, and the rotational angular velocity around the x-axis direction and the rotating angle around the x-axis direction are respectively less than a second preset rotational angular velocity threshold and a second preset rotating angle threshold, determine that the apparatus rotates clockwise around the x-axis and the rotational change direction of the apparatus is an upward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively greater than a first preset rotational angular velocity threshold and a first preset rotating angle threshold, determine that the apparatus rotates counterclockwise around the y-axis and the rotational change direction of the apparatus is a rightward direction; or when an absolute value of the rotational angular velocity around the y-axis direction is greater than an absolute value of the rotational angular velocity around the x-axis direction, and the rotational angular velocity around the y-axis direction and the rotating angle around the y-axis direction are respectively less than a second preset rotational angular velocity threshold and a second preset rotating angle threshold, determine that the apparatus rotates clockwise around the y-axis and the rotational change direction of the apparatus is a leftward direction.

In another embodiment of the present disclosure, the processor 1002 is further configured to preset displacement by which the application program interface moves.

In another embodiment of the present disclosure, the display 1001 is further configured to move the application program interface of the apparatus towards the rotational change direction by the displacement, and display the application program interface in the second position of the display.

The apparatus in this embodiment may be used to implement the technical solution in the embodiment of the interface display method, and implementation principles and technical effects of the solution are similar, and details are not described herein again.

Figure 11:
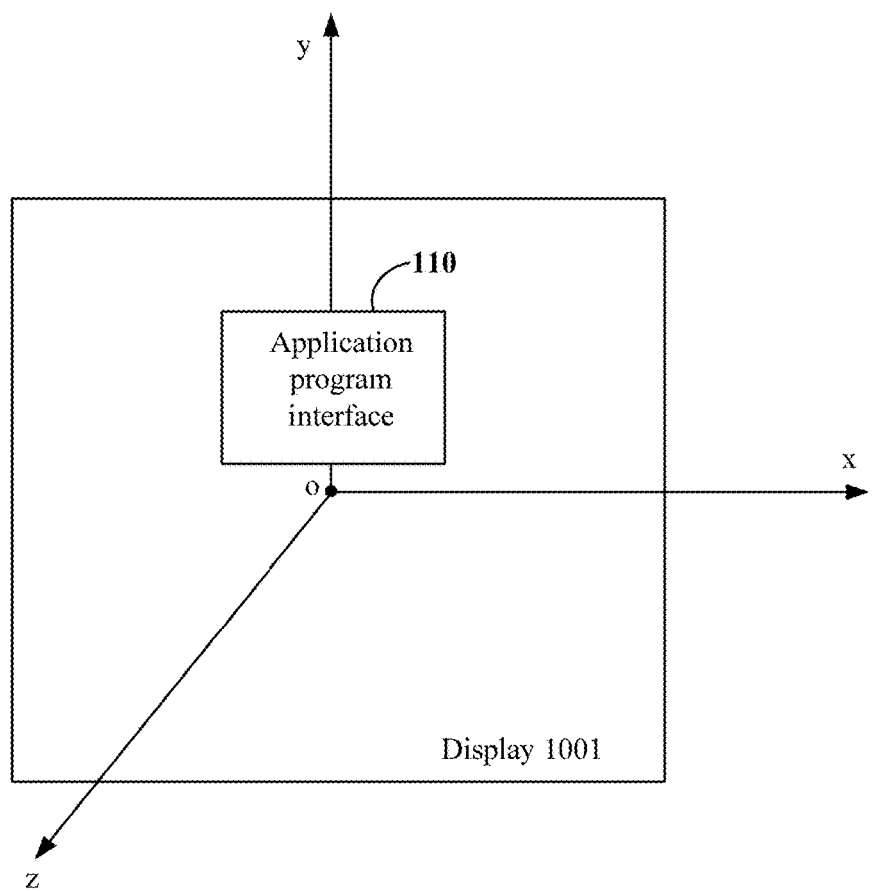
FIG. 11 is a schematic diagram 1 of interface display according to an embodiment of the present disclosure.
Figure 12:
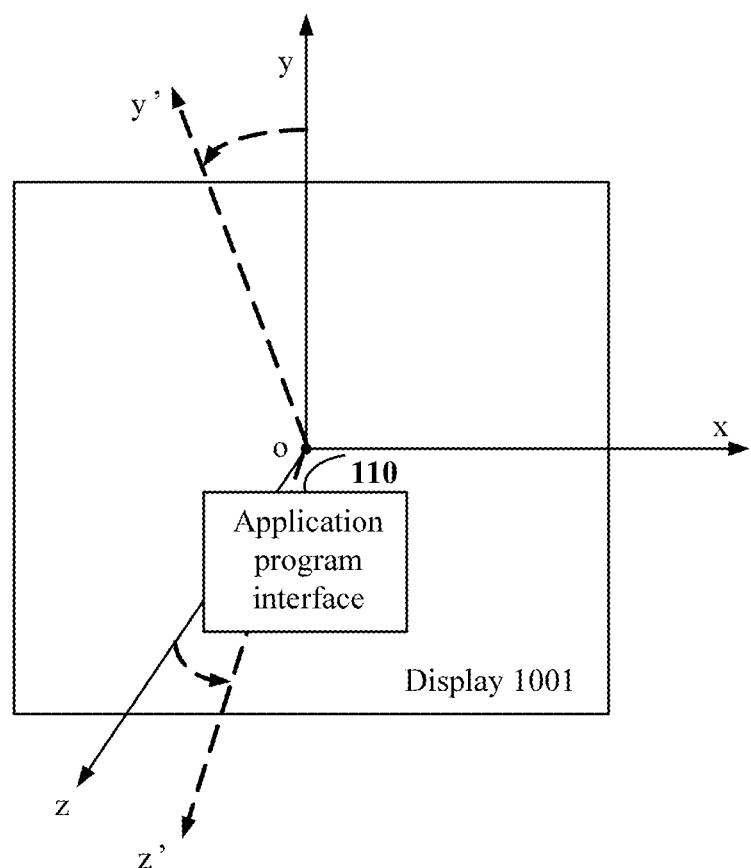
FIG. 12 is a schematic diagram 2 of interface display according to an embodiment of the present disclosure.

FIG. 11 is a schematic diagram 1 of interface display according to an embodiment of the present disclosure, and FIG. 12 is a schematic diagram 2 of interface display according to an embodiment of the present disclosure. As shown in FIG. 11, the interface display apparatus 100 is placed perpendicular to an xoz plane, where a coordinate origin is a center point of a screen of the display 1001. An application program interface 110 is displayed in the first position of the display 1001 of the interface display apparatus 100. When the apparatus rotates counterclockwise around the x-axis, that is, the rotational angular velocity around the x-axis direction is greater than a first preset rotational angular velocity threshold, the rotational change direction of the apparatus is a downward direction. Then, as shown in FIG. 12, the apparatus is perpendicular to the xoz' plane and parallel to an xoy' plane in this case. The application program interface 110 is moved, according to the rotational change direction, towards the rotational change direction by specific displacement, from an original first position to a second position for displaying, where the rotational change direction in FIG. 12 is a downward direction; that is, the application program interface 110 is finally displayed in the second position of the display 1001.

Implementation principles and technical effects of the technical solution in this embodiment are similar to those in the method embodiment, and details are not described herein again.

In the several embodiments provided in the present application, it should be understood that the disclosed device and method may be implemented in other manners. For example, the described device embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. A part or all of the modules may be selected according to actual requirements to achieve the purposes of the solutions of the embodiments.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The storage medium includes any medium that can store program code, such as a read-only memory (ROM), a random-access memory (RAM), a magnetic disk, or an optical disc.

Finally, it should be noted that the embodiments are merely intended for describing the technical solutions of the present disclosure, but not for limiting the present disclosure. Although the present disclosure is described in detail with reference to the embodiments, persons of ordinary skill in the art should understand that they may still make modifications to the technical solutions described in the embodiments or make equivalent replacements to some or all technical features thereof, without departing from the scope of the technical solutions of the embodiments of the present disclosure.

What is claimed is:

1. A method for adjusting a window display position, the method comprising:
   displaying a window in a first position of a terminal screen;
   acquiring a first rotational angular velocity of a terminal about a first axis and a second rotational angular velocity of the terminal about a second axis;
   acquiring a first rotating angle of the terminal about the first axis and a second rotating angle of the terminal about the second axis;
   comparing an absolute value of the first rotational angular velocity with an absolute value of the second rotational angular velocity;
   determining, based on the comparison, that a change of a rotation direction of the terminal occurs about the first axis when the absolute value of the first rotational angular velocity is greater than the absolute value of the second rotational angular velocity;
   determining a rotational change direction of the terminal according to the first rotating angle and the first rotational angular velocity; and
   adjusting, according to the rotational change direction of the terminal, the window to be displayed in a second position of the terminal screen.

2. The method according to claim 1, wherein determining the rotational change direction of the terminal comprises determining that the rotational change direction of the terminal corresponds to a first direction about the first axis when the first rotational angular velocity is greater than a first threshold and the first rotating angle is greater than a second threshold, wherein the first rotational angular velocity of the terminal being greater than the first threshold indicates movement of the terminal in the first direction, and wherein the first rotating angle of the terminal being greater than the second threshold indicates movement of the terminal in the first direction.

3. The method according to claim 2, wherein determining the rotational change direction of the terminal comprises determining that the rotational change direction of the terminal corresponds to the first direction about the first axis when the first rotational angular velocity is greater than the first threshold and the first rotating angle is less than a third threshold that indicates movement of the terminal in a second direction about the first axis, the second direction being opposite the first direction.

4. The method according to claim 1, wherein before adjusting, according to the rotational change direction of the terminal, the window to be displayed in the second position of the terminal screen, the method comprises presetting displacement by which the window moves.

5. The method according to claim 4, wherein adjusting, according to the rotational change direction of the terminal, the window to be displayed in the second position of the terminal screen comprises:
   moving the window of the terminal towards the rotational change direction by the displacement; and
   adjusting the window to be displayed in the second position of the terminal screen.

6. A terminal, comprising:
   a display configured to display a window in a first position;

at least one sensor configured to acquire a first rotational angular velocity of the terminal about a first axis, a first rotating angle of the terminal about the first axis, a second rotational angular velocity of the terminal about a second axis, and a second rotating angle of the terminal about the second axis; and a processor coupled to the display and the at least one sensor and configured to:
compare an absolute value of the first rotational angular velocity with an absolute value of the second rotational angular velocity;
determine, based on the comparison, that a change of a rotation direction of the terminal occurs about the first axis when the absolute value of the first rotational angular velocity is greater than the absolute value of the second rotational angular velocity; and
determine a rotational change direction of the terminal according to the first rotating angle and the first rotational angular velocity, and the display being further configured to adjust, according to the rotational change direction of the terminal, the window to be displayed in a second position.

7. The terminal according to claim 6, wherein the processor is configured to determine that the rotational change direction of the terminal corresponds to a first direction about the first axis when the first rotational angular velocity is greater than a first threshold and the first rotating angle is greater than a second threshold, wherein the first rotational angular velocity of the terminal being greater than the first threshold indicates movement of the terminal in the first direction, and wherein the first rotating angle of the terminal being greater than the second threshold indicates movement of the terminal in the first direction.

8. The terminal according to claim 7, wherein the processor is further configured to that the rotational change direction of the terminal corresponds to the first direction about the first axis when the first rotational angular velocity is greater than the first threshold and the first rotating angle is less than a third threshold that indicates movement of the terminal in a second direction about the first axis, the second direction being opposite the first direction.

9. The terminal according to claim 6, wherein the processor is further configured to preset displacement by which the window moves.

10. The terminal according to claim 9, wherein the display is further configured to move the window of the terminal towards the rotational change direction by the displacement, and adjust the window to be displayed in the second position.

11. A method for adjusting a window display position, the method comprising:
displaying a window in a first position of a terminal screen;
acquiring a first rotational angular velocity of a terminal about a first axis and a second rotational angular velocity of the terminal about a second axis;
acquiring a first rotating angle of the terminal about the first axis and a second rotating angle of the terminal about the second axis;
comparing an absolute value of the first rotational angular velocity with an absolute value of the second rotational angular velocity;
determining, based on the comparison, that a change of a rotation direction of the terminal occurs about the first axis when the absolute value of the first rotational angular velocity is greater than the absolute value of the second rotational angular velocity;
determining a rotational change direction of the terminal according to the first rotating angle and the first rotational angular velocity by:
determining that the rotational change direction of the terminal corresponds to a first direction about the first axis when the first rotational angular velocity is greater than a first threshold and the first rotating angle is greater than a second threshold, wherein the first rotational angular velocity of the terminal being greater than the first threshold indicates movement of the terminal in the first direction, and wherein the first rotating angle of the terminal being greater than the second threshold indicates movement of the terminal in the first direction;
determining that the rotational change direction of the terminal corresponds to the first direction about the first axis when the first rotational angular velocity is greater than the first threshold and the first rotating angle is less than a third threshold that indicates movement of the terminal in a second direction about the first axis, the second direction being opposite the first direction;
determining that the rotational change direction of the terminal corresponds to the second direction about the first axis when the first rotational angular velocity is less than a fourth threshold and the first rotating angle is less than the third threshold, wherein the first rotational angular velocity of the terminal being less than the fourth threshold indicates movement of the terminal in the second direction; and
determining that the rotational change direction of the terminal corresponds to the second direction about the first axis when the first rotational angular velocity is less than the fourth threshold and the first rotating angle is greater than the second threshold; and
adjusting, according to the rotational change direction of the terminal, the window to be displayed in a second position of the terminal screen.

* * * * *